(12) United States Patent
Haar (10) Patent No.: US 8,648,483 B2
(45) Date of Patent: Feb. 11, 2014

(54) VERTICAL AXIS WIND TURBINE SYSTEM

(75) Inventor: Jonathan Haar, Cambridge, MA (US)

(73) Assignee: Eastern Wind Power, Cambridge, MA (US)

( * ) Notice: Subject to any disclaimer, the term of this patent is extended or adjusted under 35 U.S.C. 154(b) by 217 days.

(21) Appl. No.: 13/222,727

(22) Filed: Aug. 31, 2011

(65) Prior Publication Data

US 2012/0051913 A1 Mar. 1, 2012

Related U.S. Application Data (63) Continuation-in-part of application No. 12/403,001, filed on Mar. 12, 2009, now Pat. No. 8,030,792.

(51) Int. Cl.
*F03D 9/02* (2006.01)

(52) U.S. Cl.
USPC .............................................. 290/44; 290/55

(58) Field of Classification Search
USPC ...................................................... 290/44, 55
See application file for complete search history.

(56) References Cited

U.S. PATENT DOCUMENTS

| | | | |
|---|---|---|---|
| 4,115,027 A | 9/1978 | Thomas | |
| 4,247,252 A | 1/1981 | Seki et al. | |
| 4,247,253 A | 1/1981 | Seki et al. | |
| 4,285,636 A | 8/1981 | Kato et al. | |
| 4,421,458 A | 12/1983 | Allan et al. | |
| 4,456,429 A | 6/1984 | Kelland | |
| 5,057,696 A | 10/1991 | Thomas | |
| 5,203,672 A | 4/1993 | Wolf | |
| 5,332,925 A | 7/1994 | Thomas | |
| 5,336,933 A | 8/1994 | Ernster | |
| 5,503,525 A | 4/1996 | Brown et al. | |
| 5,527,152 A | 6/1996 | Coleman et al. | |
| 6,320,273 B1 | 11/2001 | Nemec | |
| 6,784,566 B2 | 8/2004 | Thomas | |
| 6,864,594 B2 | 3/2005 | Seki | |
| 6,974,309 B2 | 12/2005 | Seki | |
| 7,109,599 B2 | 9/2006 | Watkins | |
| 7,352,076 B1 | 4/2008 | Gabrys | |
| 7,425,776 B2 | 9/2008 | Ketcham | |

(Continued)

FOREIGN PATENT DOCUMENTS

| | | |
|---|---|---|
| GB | 2008202 | 5/1979 |
| WO | 9213192 | 8/1992 |

(Continued)

OTHER PUBLICATIONS

Small Wind Certification Council, Small Wind Turbine Certification Policy, Clifton Park, NY, May 2010, pp. 1-27.

(Continued)

*Primary Examiner* — Tho D Ta
(74) *Attorney, Agent, or Firm* — Hovey Williams LLP (57) ABSTRACT

Wind turbine system. The system includes a lower wind speed vertical axis wind turbine operatively connected to a first electrical motor/generator and a higher wind speed vertical axis wind turbine operatively connected to at least one second electrical motor/generator. Electrical power from the first electrical motor/generator is directed to the at least one second electrical motor/generator and mag-lev system to cause the higher wind speed turbine to begin turning. A start-up assistance subsystem which acts like a local wind accelerator and produces a positive torque to assist in the start-up of a vertical axis wind turbine is also provided.

9 Claims, 9 Drawing Sheets

(56) References Cited

U.S. PATENT DOCUMENTS

| | | |
|---|---|---|
| 7,849,596 B2 | 12/2010 | Sauer et al. |
| 7,948,110 B2 | 5/2011 | Morgan et al. |
| 8,011,876 B2 * | 9/2011 | Gradwohl et al. ............ 415/4.2 |
| 8,030,792 B2 | 10/2011 | Haar |
| 8,087,894 B2 * | 1/2012 | Brooks ........................ 416/117 |
| 8,360,713 B2 * | 1/2013 | Carosi et al. .................. 415/4.2 |
| 2002/0105190 A1 | 8/2002 | Thomas |
| 2004/0041405 A1 | 3/2004 | Seki |
| 2004/0170501 A1 | 9/2004 | Seki |
| 2007/0177970 A1 | 8/2007 | Yokoi |
| 2007/0231139 A1 | 10/2007 | Yokoi |
| 2008/0159873 A1 | 7/2008 | Tran |
| 2008/0191487 A1 | 8/2008 | Morgan et al. |
| 2008/0213083 A1 | 9/2008 | Unno |
| 2008/0256795 A1 | 10/2008 | Edwards |
| 2008/0273978 A1 | 11/2008 | Watkins |
| 2008/0309090 A1 | 12/2008 | Stern et al. |
| 2009/0097981 A1 | 4/2009 | Gabrys |
| 2009/0167030 A1 | 7/2009 | Watkins |
| 2009/0191057 A1 * | 7/2009 | Knutson ......................... 416/23 |
| 2009/0220339 A1 * | 9/2009 | Wu et al. .......................... 416/1 |
| 2010/0045039 A1 * | 2/2010 | Stroup et al. .................... 290/44 |
| 2010/0133829 A1 | 6/2010 | Bertenyi |
| 2010/0181958 A1 | 7/2010 | Caudill |
| 2010/0259046 A1 | 10/2010 | Kota et al. |
| 2011/0006543 A1 | 1/2011 | Hu |

FOREIGN PATENT DOCUMENTS

| | | |
|---|---|---|
| WO | 03058059 | 7/2003 |
| WO | 03064852 | 8/2003 |
| WO | 2005010355 | 2/2005 |
| WO | 2005085633 | 9/2005 |
| WO | 2006119922 | 11/2006 |
| WO | 2007012195 | 2/2007 |
| WO | 2007021992 | 2/2007 |
| WO | 2008077199 | 7/2008 |
| WO | 2008100580 | 8/2008 |
| WO | 2008119994 | 10/2008 |
| WO | 2008141763 | 11/2008 |
| WO | 2008141813 | 11/2008 |
| WO | 2009075853 | 6/2009 |
| WO | 2009075872 | 6/2009 |

OTHER PUBLICATIONS

International Standard, Wind turbines—Part 2: Design requirements for small wind turbines, IEC, Geneva, Switzerland, Second Edition, Reference No. IEC 61400-2:2006(E), pp. 1-181.

Abbott et al., National Advisory Committee for Aeronautics, Report No. 824, Summary of Airfoil Data, 1945, pp. 1-265.

Sheldahl et al., "Aerodynamic Characteristics of Seven Symmetrical Airfoil Sections Through 180-Degree Angle of Attack for Use in Aerodynamic Analysis of Vertical Axis Wind Turbines," Sandia National Laboratories Energy Report, Mar. 1981, pp. 1-120.

Strickland, "The Darrieus Turbine: A Performance Prediction Model Using Multiple Streamtubes," Sandia Laboratories Energy Report, Oct. 1975, pp. 1-36.

Cochran et al., "Integrating Wind Energy into the Design of Tall Buildings—A Case Study of the Houston Discovery Tower: Harvesting Wind Power from Tall Buildings," 2008, pp. 1-11.

* cited by examiner

VERTICAL AXIS WIND TURBINE SYSTEM

CROSS-REFERENCE TO RELATED APPLICATIONS

The present application is a continuation-in-part of U.S. patent application Ser. No. 12/403,001, filed Mar. 12, 2009, entitled VERTICAL AXIS WIND TURBINE SYSTEM, incorporated by reference in its entirety herein.

BACKGROUND OF THE INVENTION

1. Field of the Invention

This invention relates to a wind turbine system and more particularly to a composite vertical axis wind turbine system that utilizes a lower wind speed vertical axis wind turbine to start the rotation of a higher wind speed wind turbine.

2. Description of Related Art

Wind energy is rapidly emerging as one of the most cost-effective forms of renewable energy with an ever-increasing installed capacity around the world. One of the widely recognized types of turbines used for electricity generation is the well-recognized Horizontal Axis Wind Turbine (HAWT). This type of turbine features a high blade tip velocity ratio, relatively high power generation efficiency, and low start-up torque. The second major group of wind turbines is the Vertical Axis Wind Turbines (VAWT), which possess several inherent advantages over HAWTs: VAWTs do not have to be yaw-adjusted to follow the changing direction of prevailing wind, and consequently handle gusts more efficiently; the power generator can be integrated into the system at ground level, reducing the structural requirements of the support tower, are much quieter in operation, lower in vibration and bird-friendly. However, a major disadvantage of most VAWT configurations is that they require a relatively high start-up torque. An omnidirectional vertical wind turbine electric generator system has been disclosed in U.S. Pat. No. 7,109,599 to Watkins. The contents of this patent are incorporated herein by reference.

Because of typical blade configurations and mechanical stiction ("static friction") in vertical axis wind turbines, it is known that starting a vertical axis wind turbine requires a higher wind speed than is necessary to keep the turbine rotating once it is in motion. Relatively smaller vertical axis wind turbines will start at lower wind speeds such as, for example, 3 miles per hour, whereas larger-sized units would require a higher wind speed (say 8 miles per hour) to start but might continue to rotate, once having been started, at, for example, 5 miles per hour.

It is an object of the present invention to address this major deficiency of VAWT by proposing a double-vertical-axis-turbine system with a torque-amplifying cascade arrangement. This system features a small vertical axis turbine that starts at a relatively lower wind speed which, once up to speed, subsequently starts a relatively higher wind speed vertical axis wind turbine.

SUMMARY OF THE INVENTION

In one aspect, the wind turbine system according to the invention includes a lower wind speed vertical axis turbine operatively connected to a first electrical motor/generator. A higher wind speed vertical axis wind turbine is provided and is operatively connected to at least one second electrical motor/generator. Electrical power from the first electrical motor/generator is directed to at least one second electrical motor/generator to start the higher wind speed turbine. In a preferred embodiment, the lower wind speed vertical axis wind turbine is disposed on top of the higher wind speed vertical axis wind turbine. It is preferred that the higher wind speed vertical axis wind turbine be operatively connected to two second electrical motor/generators.

In another preferred embodiment, the system includes an anemometer to measure wind speed such that the output of the anemometer is operatively connected to the first electrical motor/generator to direct power to the at least one second electrical motor/generator when measured wind speed reaches a selected level. Power electronics are provided to distribute electrical power from the first and second electrical motor/generators.

In one embodiment, the lower wind speed turbine includes five blades and the higher wind speed turbine includes three blades. It is preferred that the lower wind speed turbine be designed to begin rotating at a wind speed of approximately 3 miles per hour. A suitable higher wind speed turbine is designed to "self-start" turning at a wind speed of 8 miles per hour but once started, can run at say 5 miles per hour.

The wind turbine system disclosed herein is designed for mounting on building rooftops although other locations are appropriate. It is preferred that the turbines be selected to provide power in the range of 10 kW to 30 kW. The lower wind speed turbine and the higher wind speed turbine may share a common shaft. The blades of the turbines may be conventional wings with a high performance cambered airfoil configuration, featuring high lift-to-drag ratios. The blades may include regions with different surface textures and treatments.

An auxiliary blade that deploys at an angle to the main blades by use of a passive tail to serve as a wind directing and accelerating scoop blade that can swerve at an angle of say 20° to 60° off the prevailing wind may be provided, as in a sailboat's jib changing the mainsails' apparent wind and increasing the surface area of the overall "sail" area.

In a further embodiment, the combination of a vertical axis wind turbine and a start-up assistance subsystem is disclosed. The start-up assistance subsystem comprises auxiliary blades and a wind direction orientation system. In one aspect, the wind direction orientation system comprises passive means for detecting wind direction and orienting the auxiliary blades accordingly (such as in the case of an orienting tail). In a further aspect, the wind direction orientation system comprises active means for detecting wind direction and orienting the auxiliary blades accordingly (such as in the case of an anemometer or wind station coupled with motor driven orientation of the blades). The auxiliary blades are coupled to an outer vane support ring that is connected via support members to the base of the vertical axis wind turbine.

DESCRIPTION OF THE PREFERRED EMBODIMENT

Figure 1:
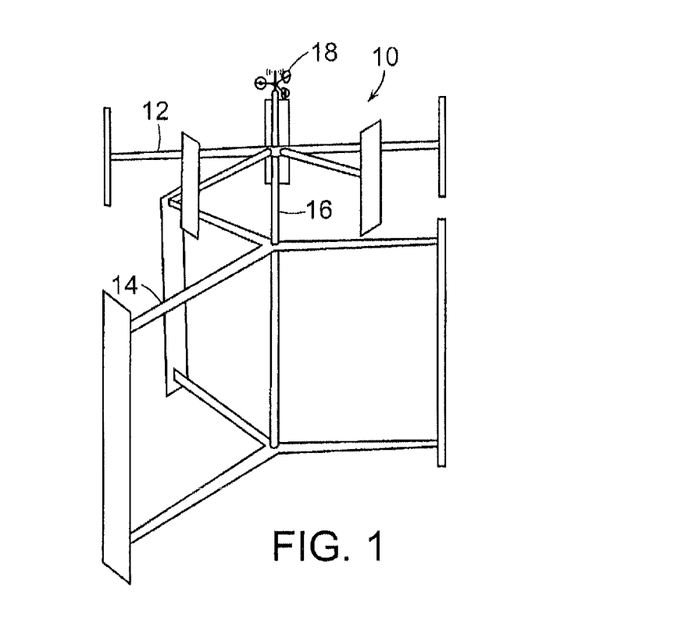
FIG. 1 is a perspective, schematic view of an embodiment of the invention disclosed herein.

As shown schematically in FIG. 1, the wind turbine system 10 includes a lower wind speed vertical axis wind turbine 12 mounted above a higher wind speed vertical axis wind turbine 14. An anemometer 18 is mounted on the lower wind speed vertical axis turbine 12 brace system, out of the way of the turbine's exhaust flow.

Figure 2:
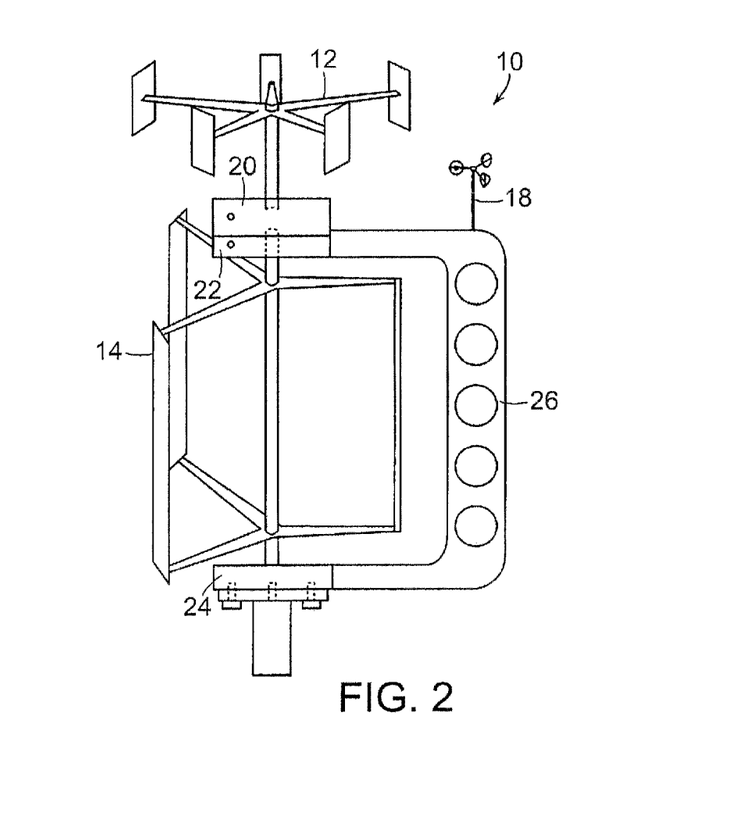
FIG. 2 is a perspective view of another embodiment of the invention.
Figure 3:
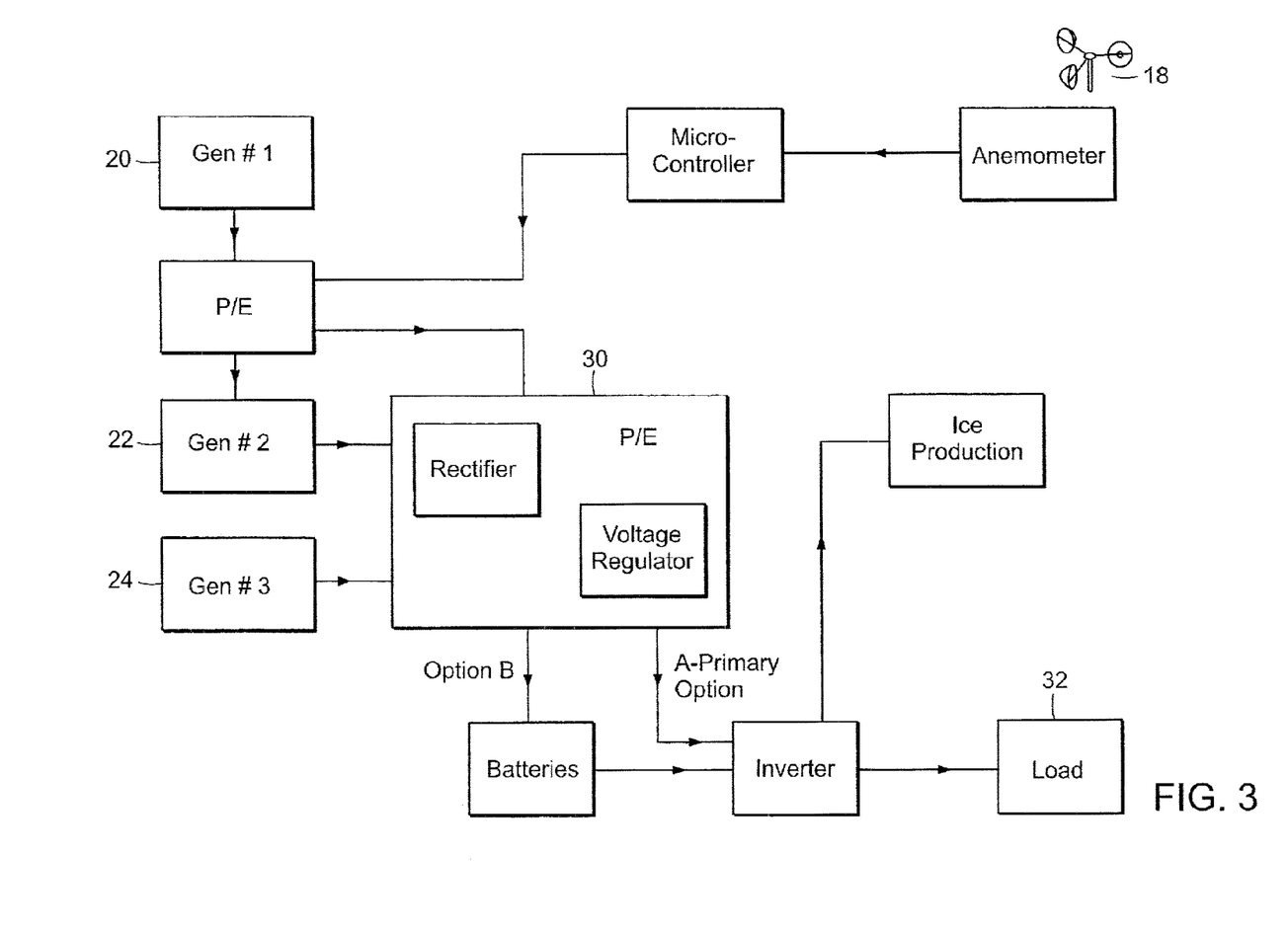
FIG. 3 is a block diagram showing the power electronics arrangement.

An embodiment of the invention is shown in greater detail in FIG. 2. The lower wind speed turbine 12 includes five blades but it should be understood that more or fewer than five blades may be utilized. The lower wind speed turbine 12 is operatively connected to a motor/generator 20. The turbine 12 sits above a relatively higher wind speed turbine 14 that is operatively connected to a generator 22. The higher wind speed turbine 14 is also operatively connected to another generator 24. In this embodiment, the wind turbines 12 and 14 are supported on a brace 26 that also supports the anemometer 18. As shown in FIG. 3, the output of the motor/generators 20, 22 and 24 are delivered to the power electronics (P/E) module 30 and ultimately to a load 32 that may be the electrical grid or an on-site storage system for either local use or as a power reservoir to be either a back-up system or for use at peak demand/peak utility pricing. The five bladed lower wind speed vertical axis wind turbine 12 is designed to start in light winds of, for example, approximately 3 miles per hour and begin producing usable power at, say 5 MPH, producing 40% of generator's 20 rated capacity. The larger, higher wind speed vertical axis turbine 14 requires a higher start-up torque to operate. For example, the higher wind speed turbine 14 may not start in winds lighter than 8 miles per hour, but once rotating, it can sustain rotation at a lower speed such as 5 miles per hour. Suitable light wind vertical axis wind turbines are available from PacWind, Inc. of Torrance, Calif. See, U.S. Pat. No. 7,109,599 mentioned above.

Therefore under this scenario, when the anemometer 18 detects a 5 mile per hour wind speed, electrical energy from the generator 20 (since the lower wind speed turbine 12 is already rotating) is directed to the motor/generator 22 which subsequently starts the turbine 14. Once the higher wind speed vertical axis turbine 14 is sustainably rotating, electrical energy from both the generator 20 and the generator 22 is distributed to the load 32.

An aid to start-up and braking in an "over-speed" condition may be a pair of Neodymium magnets (not shown) mounted on the turbine 14's input and on generator 24's output shaft with generator 24's magnet wrapped with one or more copper coils connected to the P/E circuit 30. The Neodymium magnets are positioned to lift turbine 14 off generator 24's bearings a few centimeters to reduce the start-up stiction and bearing wear. In an "over-speed" event, the excess current of generator 24 can be switched through the P/E controls to charge the coils wrapping the magnet on generator 24 thereby reversing the magnet's polarity and acting as an "electric brake" on turbine 14 output shaft until a transient gust has passed, as determined by the anemometer 18. Anemometer 18 may also "chop" generators 20 and 24's variable voltage output being sent to the P/E to not exceed acceptable voltage. The same system will be applied on a smaller scale to turbine 12's blades to control its peak torque output.

In effect, the smaller turbine 12 and its motor/generator 20 act as a starter motor for the larger, higher wind speed turbine 14, with the added assistance of the Neodymium magnet system. More importantly, an additional generator 24 is also operatively connected to the higher wind speed turbine 14. In higher winds or during gusts, the power electronics 30 will engage the third generator 24 at the bottom of the larger unit 14, creating a third level of counteracting torque against which the turbine blades will engage. This arrangement will thereby serve as both another source of electrical production and, in effect, another electronic "brake" on the turbines' shaft and therefore on the blades' rotational speed. In an "over-speed" event, the excess current of generator 24 can be switched through the P/E controls to charge the coils wrapping the magnet on 24 thereby reversing the magnet's polarity. This change of polarity acts as an "electric brake" on blade 14's output shaft until the transient gust has passed or as a means to lock down the turbine, as determined by anemometer 18.

There are thus three possible load set points (blades of turbines 12 and 14 are scaled to match to local environmental conditions) created by the sizing and choice of the three generators 20, 22 and 24. The three generators effectively create an electronic transmission with three gears sized to: 1) light wind; 2) start up to average geographic wind speed; and 3) maximum wind speed. These three generators 20, 22 and 24 are all direct drive units sitting on/under the output shaft, eliminating any output loss that would accompany the use of belts, gears and clutches in conventional transmissions.

By using three smaller generators rather than one large generator, the usable power output will start at lower speeds; stay on the power profile of generators found on the market (which have narrow/high rpm power bands for effective conversion to and from mechanical to electrical power); and, be able to produce power in gales and high winds which would cause conventional units either to clip their power output, veer out of the wind, break their unit, or just have to shut down.

The blades on the turbines 12 and 14 may be conventional wings or more advanced high lift-to-drag ratio cambered airfoil blades. The tips and connection points of the blades may receive a shape treatment to assist in energy production and lift generation, and the center shaft may be shaped to allow wind flow to pass with minimal disturbance, as would the support structure, brace 26, which may be composed of one or more supports.

If the turbine system of the invention were to be used in, for example, Boston, Mass., the smaller turbine 12 would likely kick in at approximately 3 miles per hour and produce enough power/torque to move the larger bladed unit 14 at a wind speed of 5 miles per hour. At this point, the motor/generator 22 will come on-line and will max out at approximately 13 miles per hour, the average regional wind speed, and continue to generate its maximum voltage/output throughout the generator 24 start and run-up to 29 miles per hour or greater.

Above this wind speed, both generators 22 and 24 would likely have their output clipped and maintained at a constant level so as not to damage the power electronics. It should be noted that the three generators 20, 22 and 24 may be coupled mechanically on two shafts, one for the light wind generator and one for the larger turbine, coupled with a clutch between a small output shaft and the larger turbine's shaft, or preferably electrically controlled through the power electronics resulting in a much higher output and broader power band at lower wind speeds than a conventional unit. It is preferred that the units be electrically coupled because a clutch system is both more expensive to manufacture and requires constant monitoring and maintenance and potential failure, leading to catastrophic unit failure.

With reference now to FIG. 4, in another embodiment of the invention, there is provided a start-up assistance subsystem 40 that is utilized during the start-up cycle of a VAWT to decrease the initial start-up wind speed required to start the VAWT by acting as a localized wind accelerator. Either one or both of the turbines 12 or 14 may include a start-up assistance subsystem 40; however, it will be appreciated that this system 40 is suitable for use with any lift-based or drag-based VAWT and is not limited to the turbines 12 or 14 disclosed herein. In one aspect, as shown in FIGS. 4A and 4C, the start-up assistance subsystem comprises one or more auxiliary accelerator blades (i.e., "airfoils" or "vanes") 42 that can swerve into a pre-set angle to the prevailing wind by the counter action of an orienting tail 44, as discussed in more detail below. This aspect uses a passive/structural wind direction orientation system, similar to a rooftop weather vane. In another aspect, as shown in FIGS. 4B and 4D, the start-up assistance subsystem 40 does not include an orienting tail, but instead relies on an active mechanical or electrical/electromechanical wind direction orientation system, which comprises a sensor for detecting wind direction and a positioning system for orienting the auxiliary accelerator blades. In this aspect, the wind speed and direction can be detected electrically using a wind logger (anemometer) or a weather station (not shown) that can determine wind direction, duration of gust, and wind speed and then transmit an appropriate signal to the start-up assistance subsystem to orient the auxiliary blades 42 accordingly. The radial orientation of the auxiliary blades 42 will typically be positioned by a dynamoelectric machine (e.g., a stepper motor and electronic compass) that rotates the auxiliary blades 42 clockwise and/or counterclockwise into the correct position. The wind logger or weather station can be mounted on the VAWT system itself, or located remotely from the VAWT. The active wind direction orientation system can also be used to determine the conditions when it is appropriate to implement the start-up assistance subsystem 40 to overcome static friction for initial start-up.

Figure 4A:
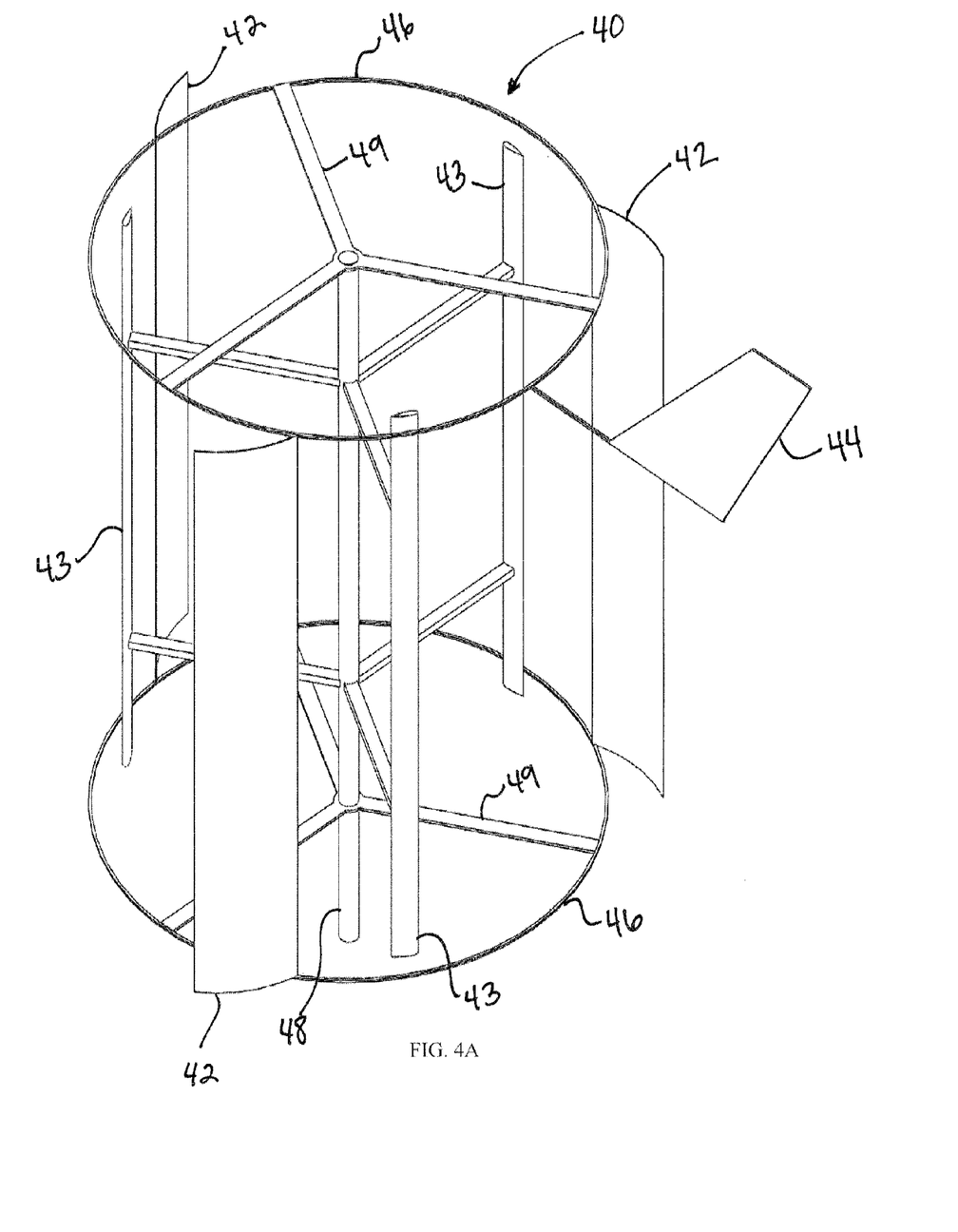
FIG. 4A is a perspective view of a VAWT comprising a start-up assistance subsystem according to one embodiment disclosed herein.
Figure 4B:
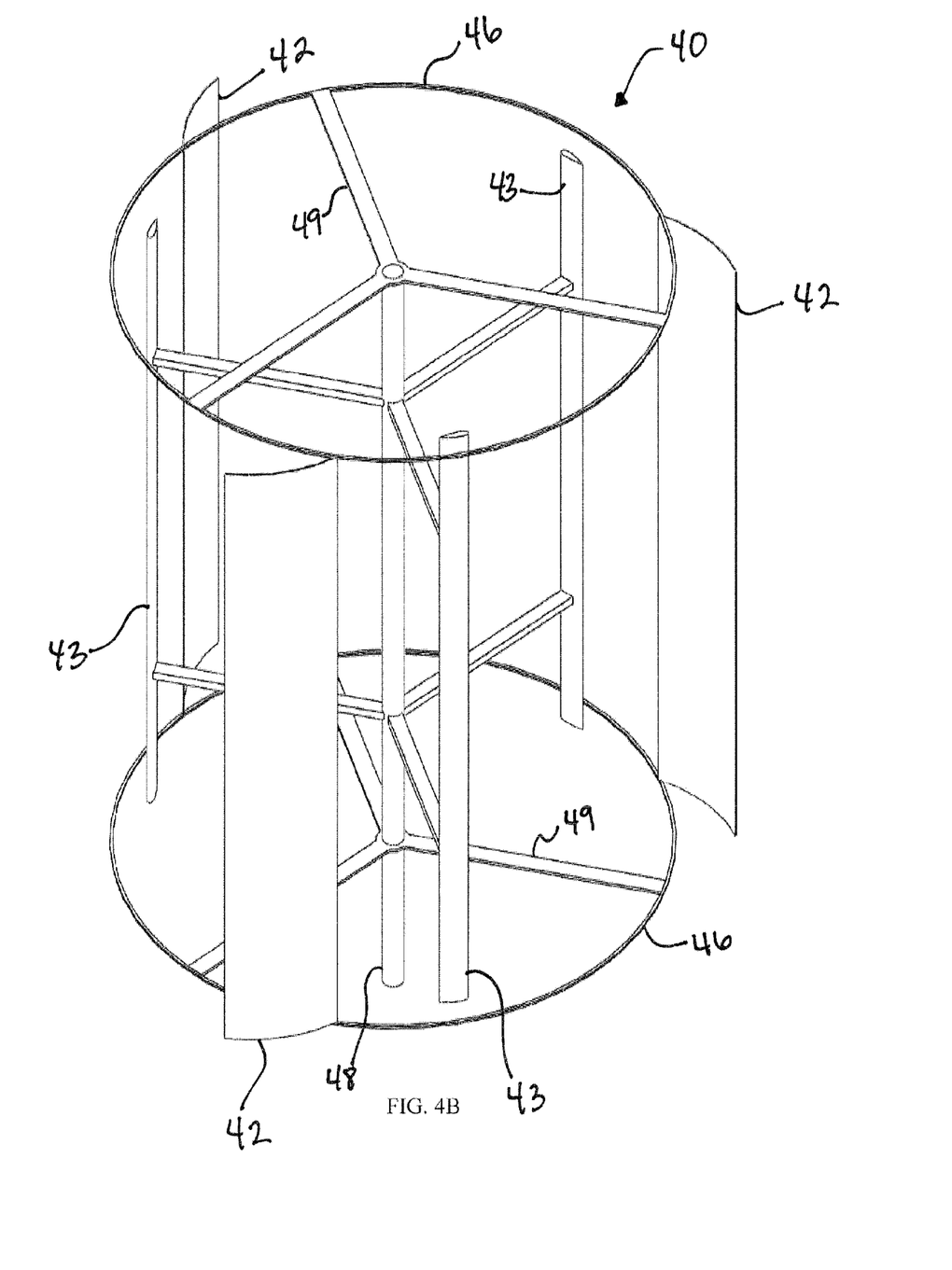
FIG. 4B is a perspective view of a VAWT comprising a start-up assistance subsystem according to another embodiment disclosed herein.

In either aspect, as shown in FIGS. 4A and 4B, respectively, the start-up assistance subsystem 40 further comprises an outer vane support ring 46 rotationally supported on bearings (not shown), which is preferably operatively connected to the central shaft or base 48 of the VAWT by one or more support members 49 (preferably about three support members). The auxiliary blades 42 are each defined by a leading edge 42a and a trailing edge 42b. The leading edge 42a points outwardly, away from the vane support ring 46 and neighboring turbine blade 43, while the trailing edge 42b is at the connection point of the auxiliary blade 42 to the support ring 46. The outer vane support ring 46 is operable to dispose the auxiliary blades 42 in correct alignment with the turbine blades 43 to overcome blade inertia. More specifically, as the outer vane support ring 46 rotates during operation of the start-up assistance subsystem 40, described in more detail below, this in turn causes rotation of the shaft 48 (and accordingly, the turbine blades 43). It will be understood by those in the art that the actual alignment can be determined based upon both wind direction and actual turbine blade 43 location (which can be determined by the wind logger/wind station) to ensure that the auxiliary blades 42 are oriented in the proper azimuthal position relative to the wind, as well as to the blades 43, to provide the acceleration necessary for start-up, as discussed in more detail below. This alignment can be motor driven (preferably using the generator motor and orientation encoder in combination with a suitable electromechanical system as will be understood by those in the art upon review of the present disclosure). Once the desired orientation of the auxiliary accelerator blades 42 is achieved, the outer vane support ring 46 will preferably lock into place (e.g., via a clutch system) relative to the VAWT when instructed to do so by a control sub-circuit for the duration of the start-up sequence. The support ring 46 can also be passively locked into place based upon unidirectional engagement of the central shaft 48, or a more passive system similar to the détentes of a bicycle hub where the wheel can freewheel in one direction but when turned in the other direction is locked in place by the opposing pawls in the hub, thus locking the shaft in place, as will be understood by those in the art upon review of this disclosure.

Figure 4C:
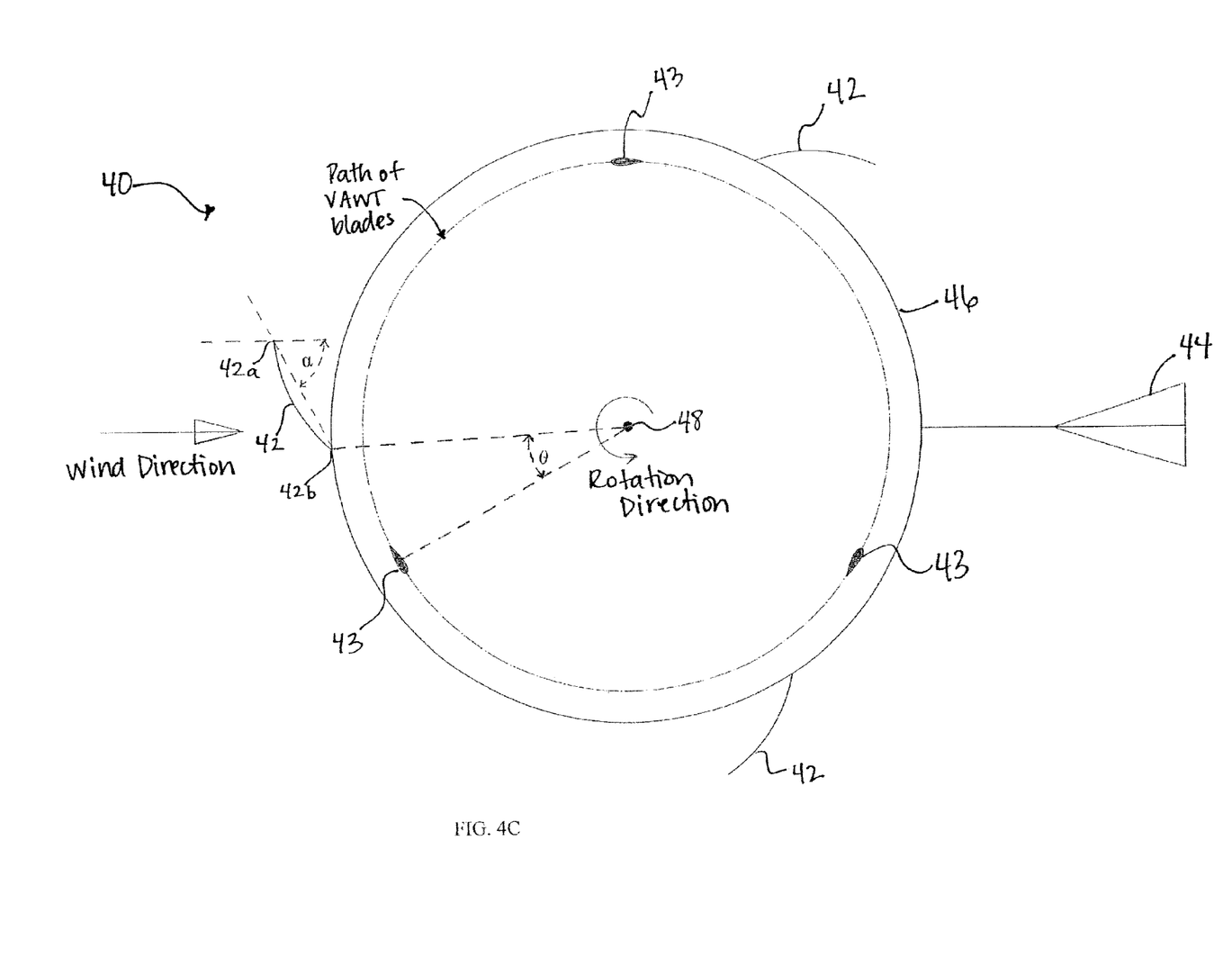
FIG. 4C is a schematic illustration (plan view) of a VAWT comprising a start-up assistance subsystem according to an embodiment of the invention.
Figure 4D:
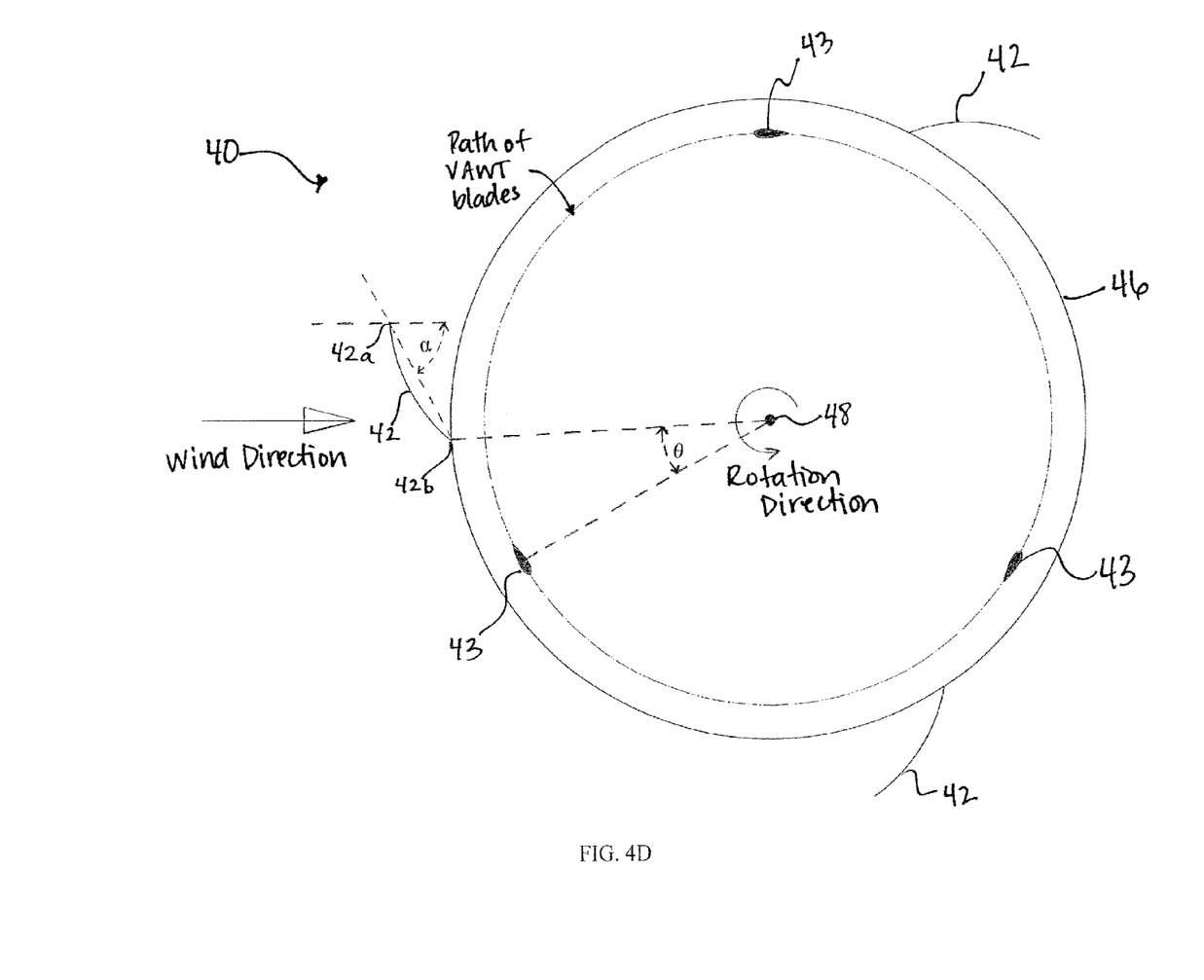
FIG. 4D is a schematic illustration (plan view) of a VAWT comprising a start-up assistance subsystem according to another embodiment of the invention.

The auxiliary accelerator blade 42 will preferably be the full height of the blades 43 of the VAWT. More preferably, the ratio of the height of the VAWT blades 43 to the height of the auxiliary accelerator blades 42 is preferably from about 1:1.5 to about 1.5:1, more preferably from about 1:1.3 to about 1.3:1, even more preferably from about 1:1.2 to about 1.2:1, and most preferably about 1:1. The width of the auxiliary accelerator blades 42 will vary depending upon their height, but will typically be from about 1 to about 5 meters, more preferably from about 1.5 to about 4 meters, even more preferably from about 2 to about 3.5 meters, and most preferably about 3 meters. The auxiliary accelerator blades 42 preferably have an arcuate cross-sectional shape and thus are concave to catch or "scoop" the wind creating/exploiting a Venturi effect on one side and direct airflow towards the leading edge of the oncoming blade 43 via the convex curvature on the other side, as can be seen in FIGS. 4C and 4D. The auxiliary accelerator blades 42 can be comprised of any suitable material including, without limitation, metals (e.g., aluminum), fiberglass, and composites (e.g., carbon fiber). It will be appreciated that the auxiliary blades 42 can be two-sided (i.e., both sides with convex curvature) to further increase the efficiency of the wind accelerator.

The number of auxiliary blades 42 is preferably based upon the number of VAWT blades 43 in the system, with one auxiliary blade 42 preferably being provided for each VAWT blade 43 (i.e., a ratio of turbine blade to auxiliary blade of about 1:1).

As shown in FIGS. 4C and 4D, respectively, the start-up subsystem 40 is disposed circumferentially about the blades 43 of the VAWT, and more specifically circumferentially about the path traveled by the blades 43 during operation of the VAWT. For ease of viewing and explanation, support members 49 are not depicted in FIGS. 4C and 4D, however, it will be understood that they are present and extend between the outer vane support ring 46 and central shaft 48. Preferably, in one embodiment as depicted, three auxiliary blades 42 are distributed evenly at 120-degree angles about the circumference of the VAWT to match up with the VAWT blades 43. In other cases, the angle would be defined by the total number of blades employed in the turbine. The circumferential placement of the auxiliary blades 42 is defined by two angles α

(alpha) and θ (theta). As depicted in FIGS. 4C and 4D, α is the effective angle of attack of the auxiliary blade 42 to the wind. The angle of attack (α) is defined as the angle formed between the wind direction and the auxiliary blade 42 chord axis. The auxiliary blade 42 chord axis extends along a plane defined by the leading edge 42a and trailing edge 42b of the auxiliary blade 42. At any circumferential position when the start-up assistance system 40 is active, α may attain a value between about 0 and about 180 degrees, with about 30 degrees to about 60 degrees being particularly preferred. The position of an auxiliary blade 42 relative to its nearest turbine blade 43 is defined by an azimuthal angle θ. This angle (θ) is measured between a plane extending from the auxiliary blade trailing edge 42b to the center of rotation (i.e., the central shaft or base 48 of the VAWT) and a plane extending from the turbine blade 43 to the center of rotation (i.e., the central shaft or base 48 of the VAWT), as depicted in the Figures. Preferably, the azimuthal angle θ is between about 20 to about 60 degrees, with about 20 to about 30 degrees being particularly preferred. Advantageously, the start-up assistance subsystem 40 decreases the required wind speed for starting the VAWT by directing localized airflow with increased speed relative to the true wind speed across the turbine blade 43, as will be readily understood by those in the art upon review of this disclosure. Preferably, the start-up assistance subsystem 40 permits the VAWT to begin rotating in wind speeds as low as about 2 m/s, preferably about 1.5 m/s, and more preferably about 1 m/s.

Preferably, after the start-up cycle is completed and the VAWT has achieved a speed of rotation that can be maintained (e.g., at least about 4 m/s), the start-up assistance subsystem 40 segmentally folds, collapses, retracts, or otherwise shifts out of the way to permit the VAWT to return to being a lift-based turbine in preferred embodiments. Thus, the start-up assistance subsystem 40 can be multi-segmented to permit such retraction. In a further aspect, the VAWT blades 43 can be extended radially outwardly (e.g., using telescoping supports) into alignment with the circumference of the outer vane support ring 46 using the generator motor. This feature of the start-up assistance subsystem 40 can be initiated when the weather station or wind logger determines that there is adequate available wind potential to maintain continuous running of the VAWT, in excess of the power cost to achieve alignment using the generator.

Figure 6A:
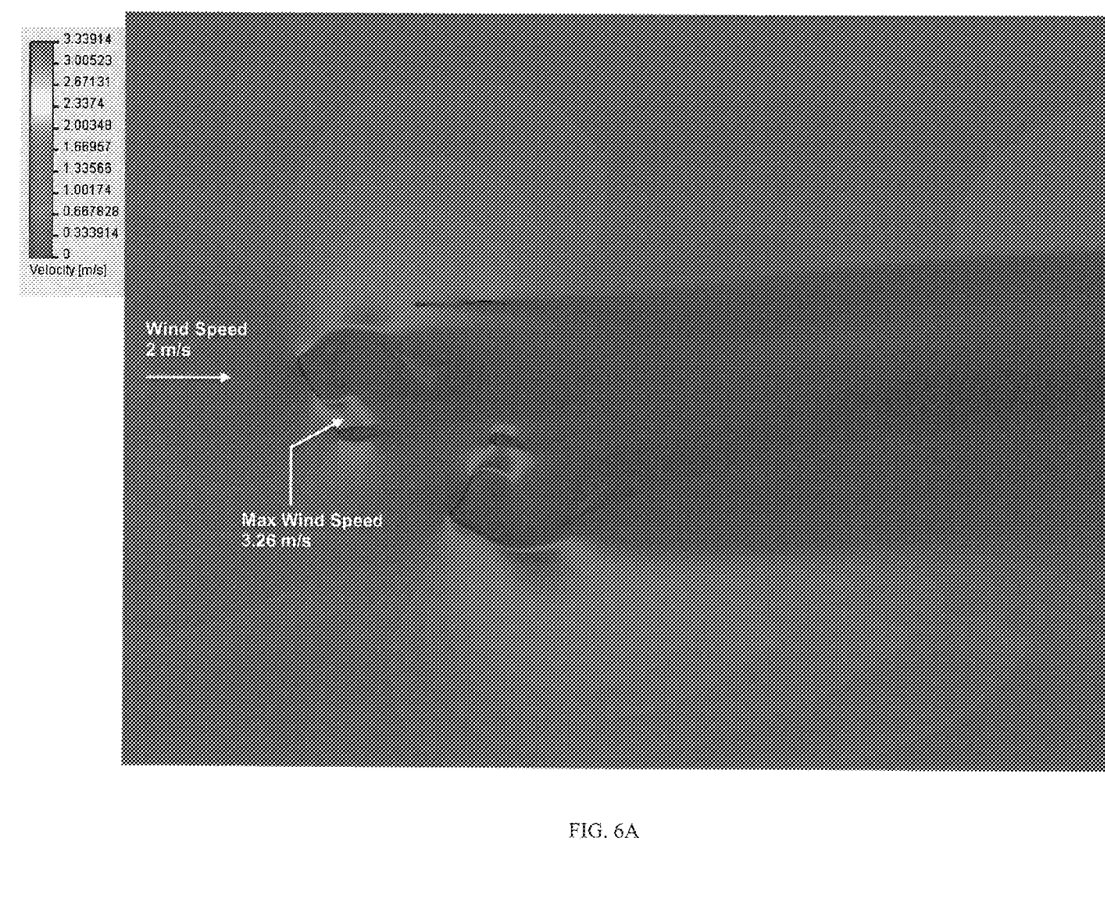
FIG. 6A shows the results of a flow field simulation using computational fluid dynamics (CFD) of a VAWT comprising a start-up assistance subsystem according to one embodiment.
Figure 6B:
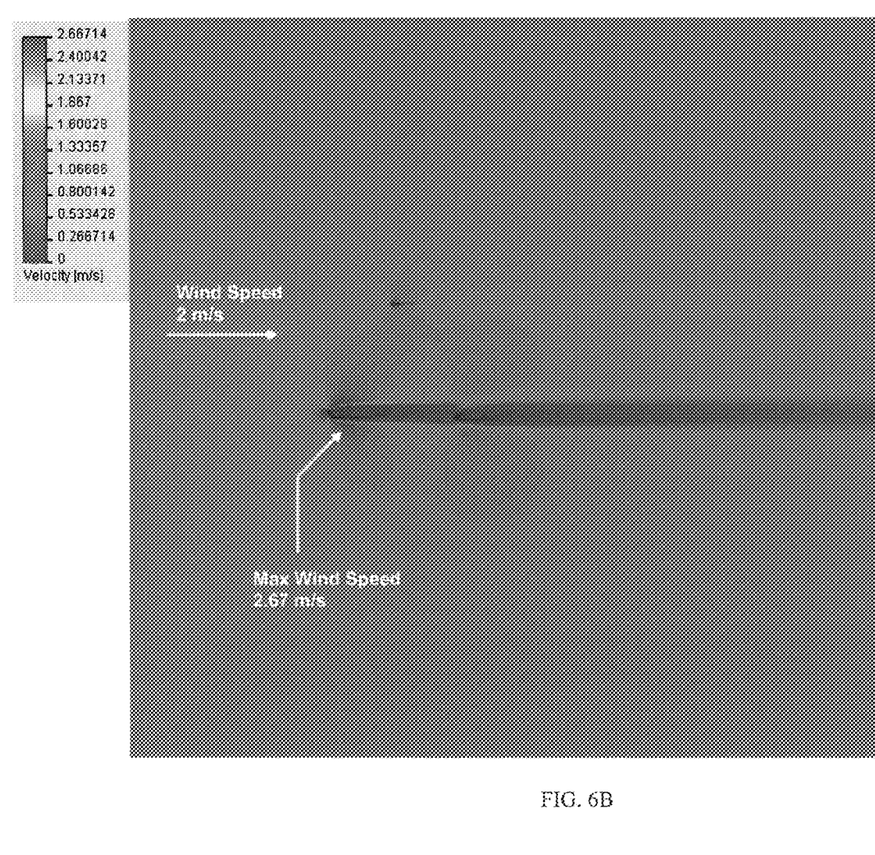
FIG. 6B shows the results of a flow field simulation using CFD of a VAWT without the aid of a start-up assistance subsystem as disclosed herein.

The advantages of the start-up accelerator subsystem 40 are illustrated in FIGS. 6A and 6B, which show a CFD simulation of the air flow field around the VAWT blades. Using a 2 m/s benchmark wind speed, the flow field in FIG. 6A demonstrates an increase of close to 100% of start-up torque over the configuration shown in FIG. 6B which does not include the start-up assistance subsystem 40, where:

$$\text{Torque} = \tfrac{1}{2}\rho V^2 A c C_t$$

and ρ=density of air; A=plan form projected area of the blade; c=Chord length of blade; and $C_t$=Torque constant. Torque is proportional to the square of velocity of the wind. Thus, double torque can be achieved even if the velocity is only accelerated by 1.414 times the original speed. By orienting the auxiliary blades 42 with the indicated curvature near the pressure side of the blades 43, whose azimuthal positions are dictated by the detected wind direction, local accelerated wind zones are created behind the blades 43 as indicated by the Max Wind Speed of 3.26 m/s in these areas in FIG. 6A. These effects result in elevated drag forces over the blade 43 surface. Furthermore, the positive tangential directions of these forces, produce a positive torque, assisting the start-up of the turbine unit.

Figure 5A:
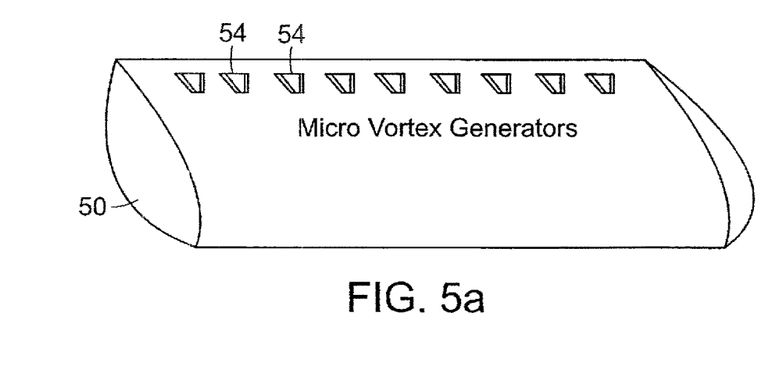
FIGS. 5a and 5b are perspective views of turbine blades showing surface treatments including micro vortex generators and dimples to cause the wind to be "stickier" on portions of the blade closer to the center of the hub to equalize and maximize pressure on the blade surface.
Figure 5B:
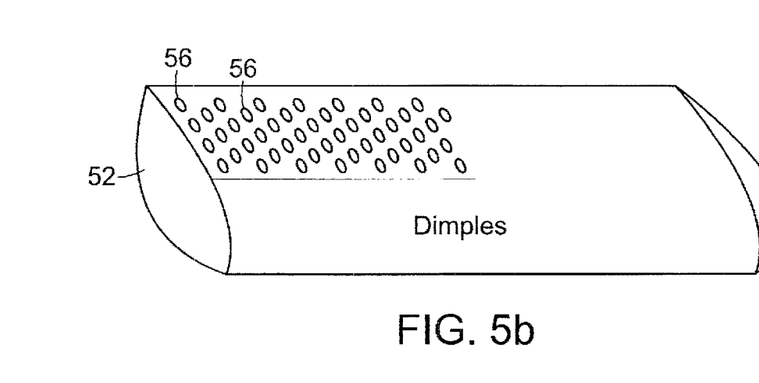

In a further embodiment of the turbines 12 or 14, as shown in FIGS. 5a and 5b, blades 50 and 52 or regions/sections thereof of either turbine 12 or 14, may contain micro vortex generators 54 or dimples 56 to result in greater extraction of energy from the prevailing wind.

It is recognized that modifications and variations of the present invention will be apparent to those of ordinary skill in the art and it is intended that all such modifications and variations be included within the scope of the appended claims.

I claim:

1. The combination of:
    a lift-based vertical axis wind turbine comprising a plurality of turbine blades; and
    a start-up assistance subsystem, said start-up assistance subsystem comprising:
        an auxiliary accelerator blade operable to create local accelerated wind zones behind said turbine blades; and
        a wind direction orientation system for detecting wind direction and orienting said auxiliary blade at a desired angle of attack relative to said wind direction, wherein said start-up assistance subsystem directs said local accelerated a wind wind zones with increased speed relative to true wind speed across said turbine blades.

2. The combination of claim 1, wherein said wind direction orientation system comprises a passive assembly.

3. The combination of claim 2, wherein said passive assembly for detecting wind direction and orienting said auxiliary blade comprises an orienting tail operably connected with said auxiliary blade.

4. The combination of claim 1, wherein said wind direction orientation system comprises an active assembly.

5. The combination of claim 4, wherein said active assembly for detecting wind direction and orienting said auxiliary blade comprises a wind sensor and motor, said wind sensor detecting wind direction and transmitting an appropriate signal to said motor for orientation of said auxiliary blade at a desired angle of attack relative to said wind direction.

6. The combination of claim 1, said vertical axis wind turbine comprising a corresponding plurality of said auxiliary blades.

7. The combination of claim 6, wherein each of said plurality of auxiliary blades are offset relative to each of said plurality of turbine blades by respective azimuthal angles θ.

8. The combination of claim 1, said start-up assistance subsystem further comprising:
    an outer vane support ring; and
    support members,
    wherein said vertical axis wind turbine comprises a central shaft, said auxiliary blades being operatively connected to said outer vane support ring and said outer vane support ring being operatively connected to said central shaft via said support members.

9. The combination of claim 8, wherein said outer vane support ring is rotatable about said central shaft, said auxiliary blades rotating circumferentially about the turbine blades with said outer vane support ring.

* * * * *